US007400498B2

(12) United States Patent
Liang et al.

(10) Patent No.: US 7,400,498 B2
(45) Date of Patent: Jul. 15, 2008

(54) NOTEBOOK COMPUTER WITH HEIGHT-ADJUSTABLE DISPLAY UNIT

(75) Inventors: Wei-Kuang Liang, Guangdong (CN); Yong-You Ming, Guangdong (CN)

(73) Assignees: Hong Fu Jin Precision Industry (Shen Zhen) Co., Ltd., Longhua Town, Bao'an District, Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 134 days.

(21) Appl. No.: 11/308,972

(22) Filed: Jun. 1, 2006

(65) Prior Publication Data
US 2007/0029105 A1    Feb. 8, 2007

(30) Foreign Application Priority Data
Jul. 22, 2005    (CN)    ......... 2005 1 0036153

(51) Int. Cl.
*G06F 1/16*    (2006.01)
(52) U.S. Cl. .............. 361/683; 348/836; 312/223.3

(58) Field of Classification Search ........... 348/836; 312/223.1–223.6; 361/679–687, 724–727
See application file for complete search history.

(56) References Cited

U.S. PATENT DOCUMENTS 6,016,171 A *    1/2000    Tsao ............... 348/836
6,381,125 B1 *    4/2002    Mizoguchi et al. ......... 361/682

* cited by examiner

*Primary Examiner*—Hung V Duong
(74) *Attorney, Agent, or Firm*—Winston Hsu

(57) ABSTRACT

A notebook computer with a height-adjustable display unit is disclosed. The notebook computer includes a main unit, a display unit, and a height-adjusting mechanism. The height-adjusting mechanism includes a saw-toothed arm, a channel, and a locking mechanism. The saw-toothed arm is rotationally coupled to the main unit. The channel is fixed in the display unit and movably accepts the saw-toothed arm therein. The locking mechanism lock or unlock the movement of the saw-toothed arm in the channel. The height-adjusting mechanism affords adjustable support for the display unit. The height of the display unit can be adjusted as required.

9 Claims, 4 Drawing Sheets

NOTEBOOK COMPUTER WITH HEIGHT-ADJUSTABLE DISPLAY UNIT

FIELD OF THE INVENTION

The present invention relates to a notebook computer, and particularly to a notebook computer with a height-adjustable display unit.

DESCRIPTION OF RELATED ART

Computers have gained widespread use, and notebook computers in particular are getting more and more popular because of their portability. To present, the liquid display unit of notebook computer is fixed upon the main body making the notebook computer's display unit and main body are very near because of its' compact size. This may cause shortcomings such as the inability for a user to get a convenient enough space and angle to use the liquid display, resulting in harm to the efficiency of work and to user's health.

China patent No. 03252626.1 (issued on Sep. 29, 2004) discloses a height-adjusting mechanism for a notebook computer's display unit. A backboard is pivotly coupled to a main unit of the notebook computer. A support-board is fixed on the display unit. An elastic piece, a graduating device, and a locking mechanism are placed between the backboard and the support-board. The height of the display unit is adjusting in this way: when the locking mechanism is unlocked, the elastic piece makes the support-board move up to a desired height; the graduating device adjusts the speed of the movement of the support-board. But the display unit can only be adjusted to a desired height. So what is needed is a notebook computer with a height-adjustable display unit, the notebook computer includes a height-adjusting mechanism, the height-adjusting mechanism can adjust the height of the display unit as required.

SUMMARY OF INVENTION

A notebook computer with a height-adjustable display unit is disclosed. The notebook computer includes a main unit, a display unit, and a height-adjusting mechanism. The height-adjusting mechanism includes a saw-toothed arm, a channel, and a locking mechanism. The saw-toothed arm is rotationally coupled to the main unit. The channel is fixed in the display unit and movably accepts the saw-toothed arm. The locking mechanism lock or unlock the movement of the saw-toothed arm in the channel.

Further features of the invention will be described or will become apparent in the course of the following detailed description when read in conjunction with the attached drawings, in which:

DETAILED DESCRIPTION

Figure 1:
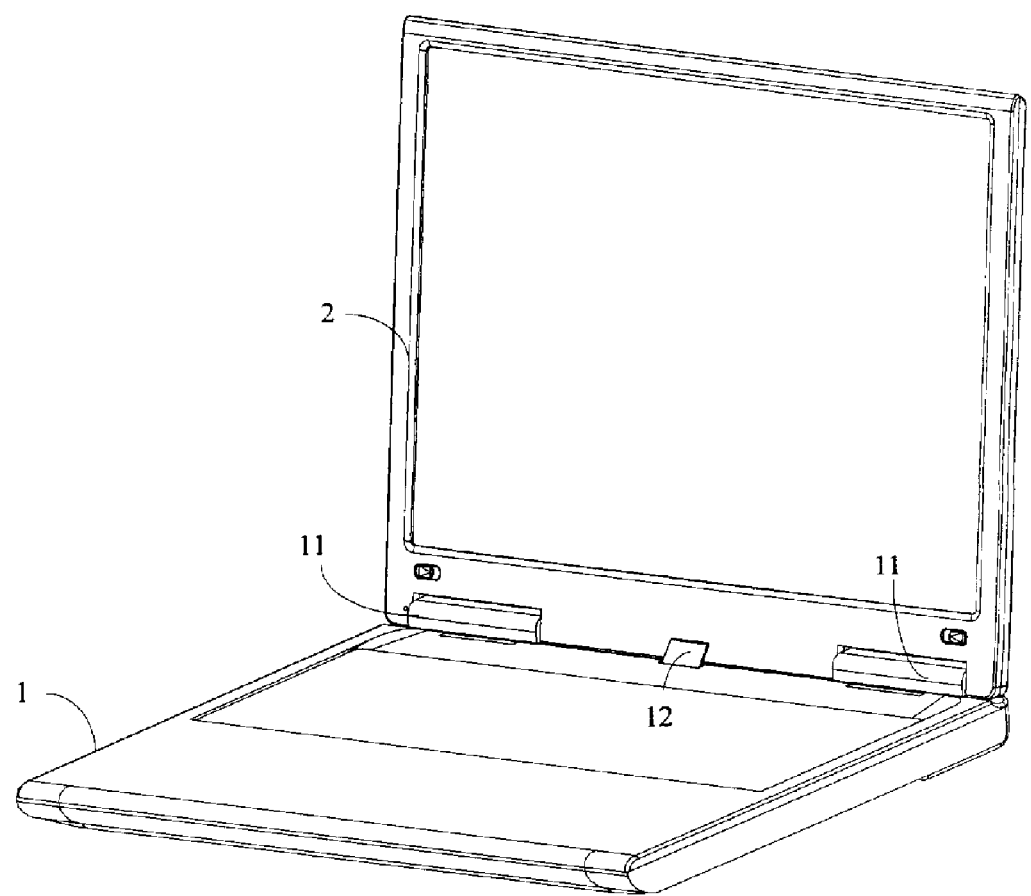
FIG. 1 is a schematic, isometric view of a notebook computer with a height-adjustable display unit according to a preferred embodiment of the present invention, the notebook computer further including a main unit.
Figure 2:
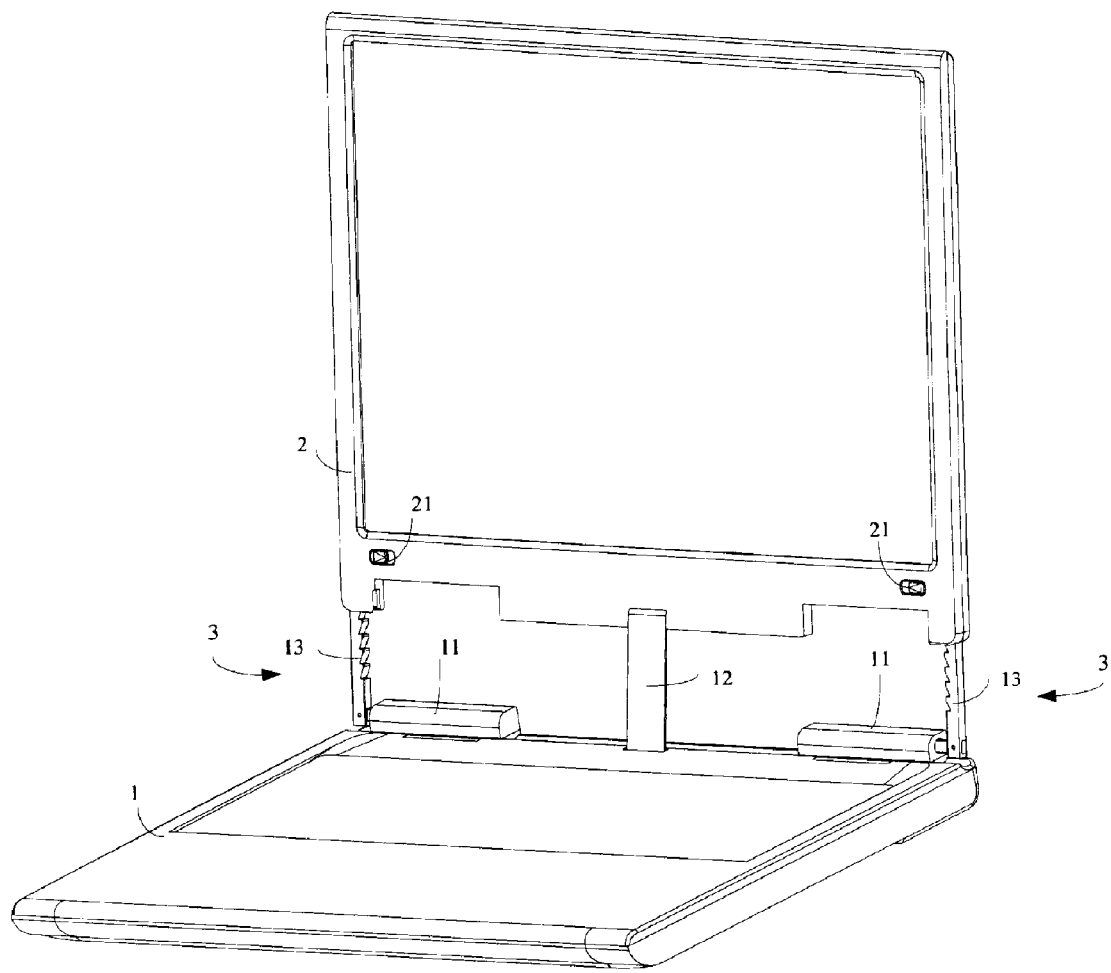
FIG. 2 is a schematic, isometric view of the notebook computer of FIG. 1, with the display unit lifted from the main unit.

Referring to FIGS. 1 and 2, a notebook computer with a height-adjustable display unit in accordance with a preferred embodiment of the present invention is shown. The notebook computer includes a main unit 1 and a display unit 2. Furthermore, the notebook computer has a pair of height-adjusting mechanisms 3 for connecting the main body 1 and the display unit 2, and a flexible cable 12 outside the height-adjusting mechanisms 3 for providing electrical communication between the main unit 1 and the display unit 2.

Figure 3:
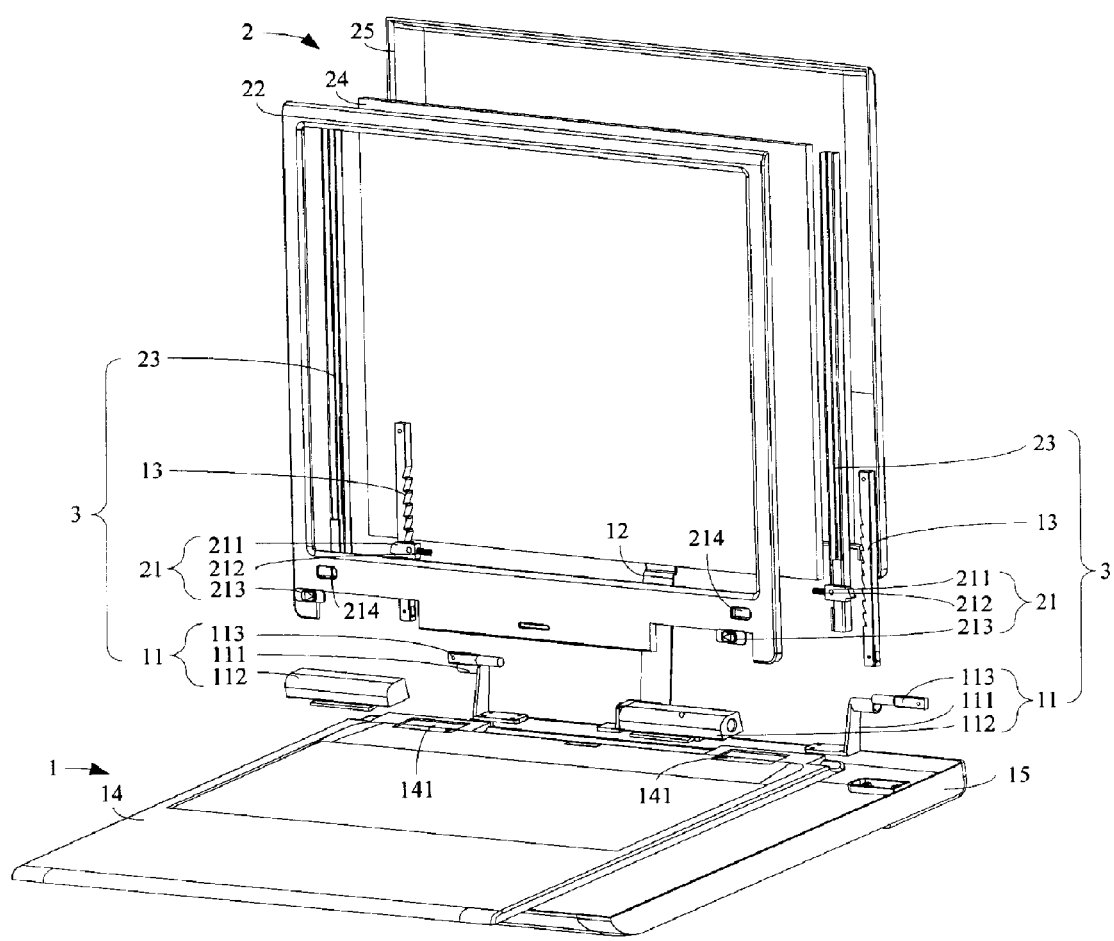
FIG. 3 is an exploded view of the notebook computer of FIG. 1.

Referring to FIG. 3, the main unit 1 includes a top cover 14 and a bottom cover 15. The display unit includes a front cover 22, a display 24, and a back cover 25.

Figure 4:
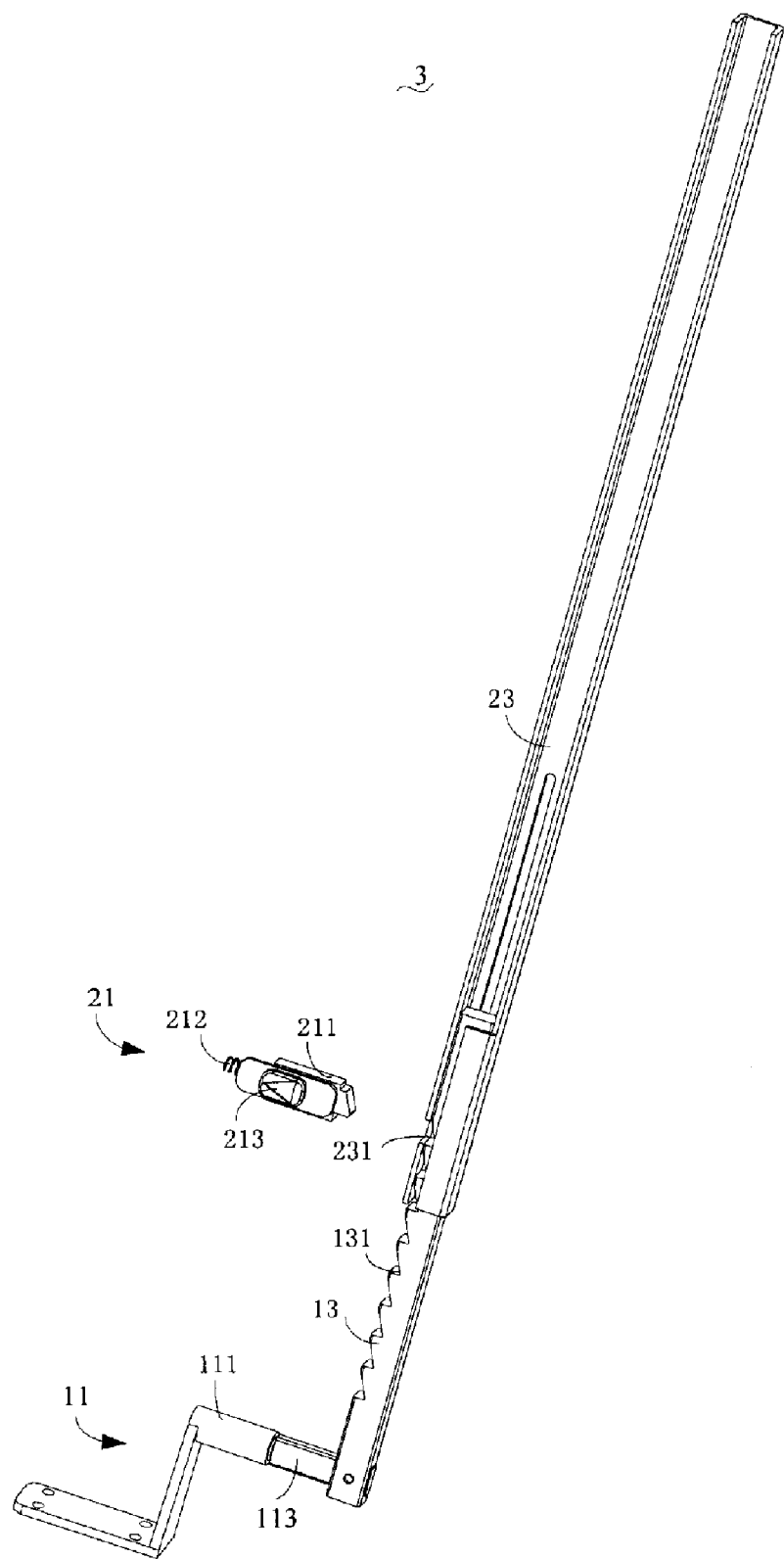
FIG. 4 illustrates a height-adjusting mechanism of the notebook computer of FIG. 3.

Referring to FIGS. 3 and 4, each height-adjusting mechanism 3 includes a hinge 11, a saw-toothed arm 13, a channel 23, and a locking mechanism 21. The hinge 11 includes a tube 111, a hinge cover 112, and a pin 113. The tube 111 is assembled on the bottom cover 15. The tube 111 passes through an opening 141 of the top cover 14, and enters into the hinge cover 112. The pin 113 couples with the tube 111, and protrudes from the hinge cover 112. The saw-toothed arm 13 is connected with the pin 113 by bolts. The channel 23 is fixed in the back cover 25 by bolts and accepts the saw-toothed arm 13 therein. The saw-toothed arm 13 can move in the channel 23. The locking mechanism 21 includes a locking piece 211, a spring 212, and a locking key 213. The locking key 213 is firmly connected with the locking piece 211. The spring 212 connects the locking piece 211 to the front cover 22. A limited opening 214 is defined in the front cover 22 and accepts the locking key 213. The locking key 213 can move in the limited opening 214. The channel 23 has a locking hole 213 in a side thereof for accepting the locking piece 211. By moving the locking key 213, the locking piece 211 connected therewith can enter into or exit out from the locking hole 231. When the locking piece 211 enters into the locking hole 231 and mates with a sawtooth 131 of the saw-toothed arm 13, the saw-toothed arm 13 thereupon fixes in the channel 23. When the locking piece 211 exits out of the locking hole 231, the saw-toothed arm 13 can move in the channel 23 so that the height of the display unit 2 relative to the main body 1 can be adjusted. The spring 212 keeps the locking piece 211 in the locking hole 231 when no operation is done on the locking mechanism 21.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A notebook computer comprising:
   a main unit;
   a display unit;
   a height-adjusting mechanism comprising:
      a saw-toothed arm rotationally coupled to the main unit;
      a channel fixed in the display unit, the channel movably accepting the saw-toothed arm; and
      a locking mechanism to lock or unlock the movement of the saw-toothed arm in the channel; and
   a flexible cable outside the height-adjusting mechanism to electrically connect the main unit with the display unit.

2. The notebook computer of claim 1, wherein the channel has a locking hole in a side thereof.

3. The notebook computer of claim 2, wherein the locking mechanism further comprises
   a locking piece to enter into or exit out from the locking hole;

a spring to keep the locking piece in the locking hole; and a locking key coupled with the locking piece.

4. The notebook computer of claim 3, wherein the display unit has a limited opening to accept the locking key.

5. A notebook computer comprising:
- a main unit;
- a display unit;
- a height-adjusting mechanism rotationally coupled to the main unit and slidably coupled to the display unit so that the display unit and the main unit are configured to have a rotation movement with respect to each other and have a displacement movement with respect to each other; and
- a flexible cable outside the height-adjusting mechanism to electrically connect the main unit with the display unit.

6. The notebook computer of claim 5, wherein the height-adjusting mechanism comprises
- a saw-toothed arm rotationally coupled to the main unit;
- a channel fixed in the display unit, the channel movably accepting the saw-toothed arm; and
- a locking mechanism to lock or unlock the movement of the saw-toothed arm in the channel.

7. The notebook computer of claim 6, wherein the channel has a locking hole in a side thereof.

8. The notebook computer of claim 7, wherein the locking mechanism further comprises
- a locking piece to enter into or exit out from the locking hole;
- a spring to keep the locking piece in the locking hole; and
- a locking key coupled with the locking piece.

9. The notebook computer of claim 8, wherein the display unit has a limited opening to accept the locking key.

* * * * *